United States Patent [19]
[11] 4,433,462
[45] Feb. 28, 1984
Stratton, Thomas A.

[54] APPARATUS FOR MANIPULATING SNAP RINGS

[76] Inventor: Stratton, Thomas A., 1600 N. Mirror, Amarillo, Tex. 79107

[21] Appl. No.: 322,024

[22] Filed: Nov. 16, 1981

[51] Int. Cl.[3] .......... B23P 19/04
[52] U.S. Cl. .......... 29/229; 29/267; 29/426.6; 81/8.1; 294/26
[58] Field of Search .......... 29/229, 267, 426.6; 81/3.01, 3.05, 8.1, 436, 437; 294/26

[56] References Cited

U.S. PATENT DOCUMENTS

| | | | |
|---|---|---|---|
| 532,557 | 1/1895 | Hoffman | 81/8.1 |
| 1,311,618 | 7/1919 | Penn | 294/26 |
| 1,328,964 | 1/1920 | Penn | 294/26 |
| 1,973,568 | 9/1934 | Keith | 294/26 X |
| 2,471,557 | 5/1949 | Bishop | 81/8.1 |
| 2,577,193 | 12/1951 | Dmse | 29/229 UX |
| 3,075,284 | 1/1963 | Salazar | 29/229 |
| 3,130,615 | 4/1964 | Harrup, Sr. | 81/8.1 |
| 3,978,573 | 9/1976 | Williams | 29/267 |
| 4,175,310 | 11/1979 | Boyd | 29/229 |

*Primary Examiner*—Charlie T. Moon
*Attorney, Agent, or Firm*—Ely Silverman

[57] ABSTRACT

These tools efficiently and rapidly remove a snap ring and clips by initially applying a torque thereto along the length of the flat portion of the clip or along the annular length of the ring. When such rings and clips are thus stressed to a limited degree they exhibit resilient twisting or torsion about such axis. The tools are adapted to then displace the portion of the smap ring or clip that provides a locking action on the groove to which the ring or clip was attached in a direction in part at least perpendicular to the wide flat surface of the portion of the snap ring or clip in the vicinity of that then resiliently twisted portion of the ring or clip and so move that portion of the ring that initially provided locking action on the groove therefor in a direction parallel to or along the wider initial plan or surface of the snap of the snap ring or clip surface. Such movement controllably and readily disengages the locking portion of the snap ring or clip. The ring or clip is then controllably moved transversely to the plane of the flat surface thereof to completely remove the ring. The tools also serve to similarly control such snap rings or clips during installation thereof.

3 Claims, 38 Drawing Figures

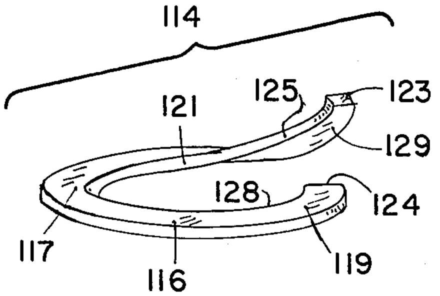
FIG. 9
FIG. 10
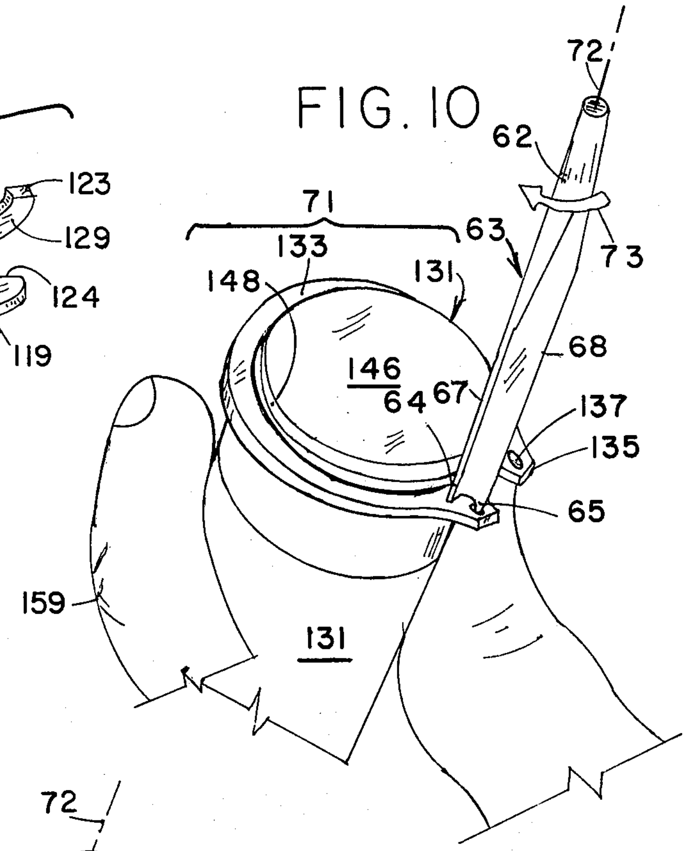
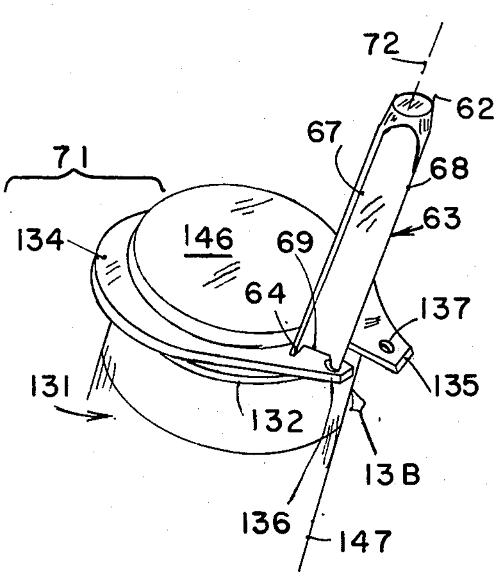
FIG. 11
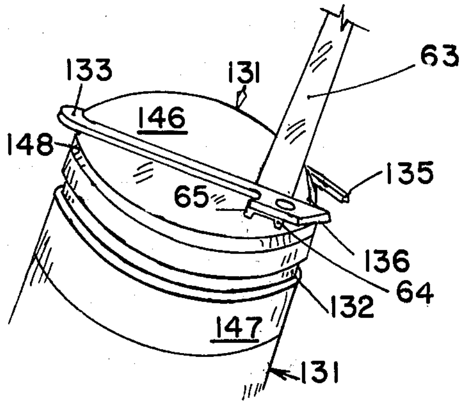
FIG. 12

FIG.13
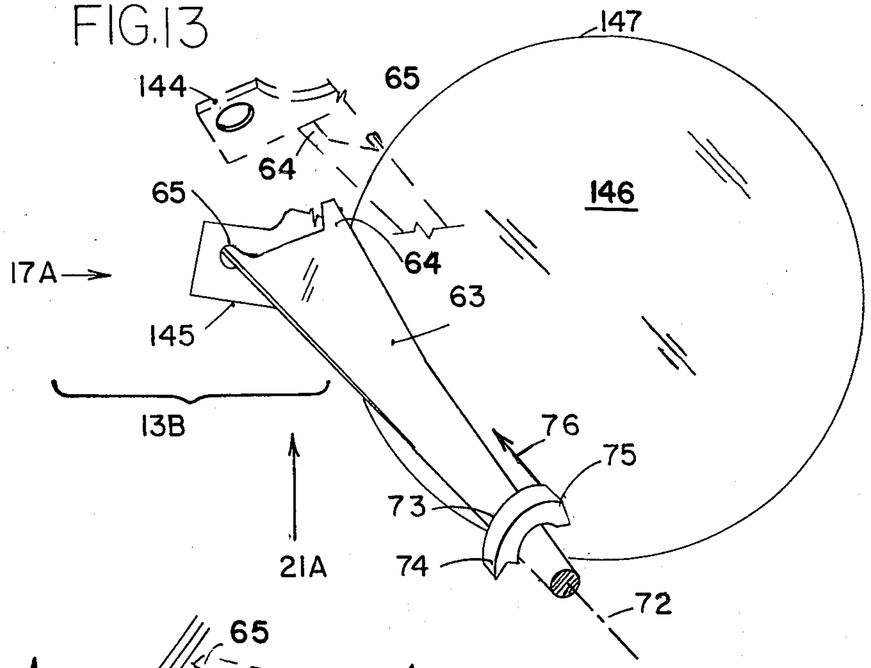
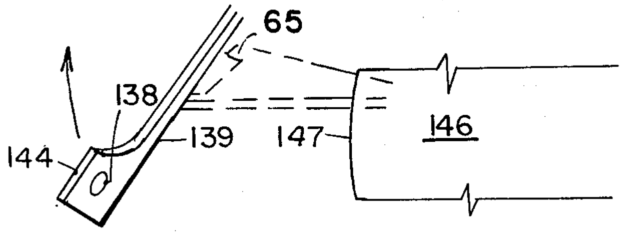
FIG.16
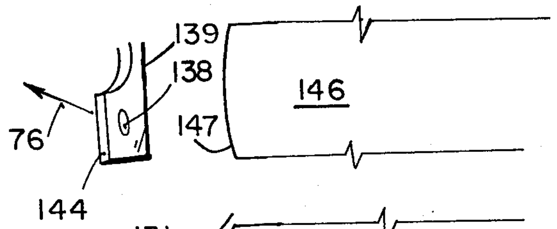
FIG.15
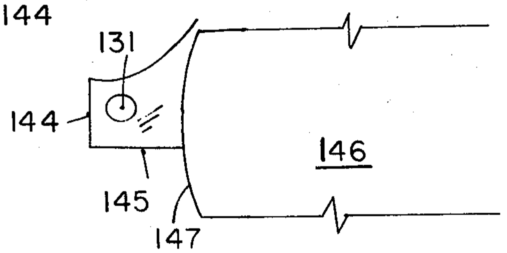
FIG.14

FIG. 31
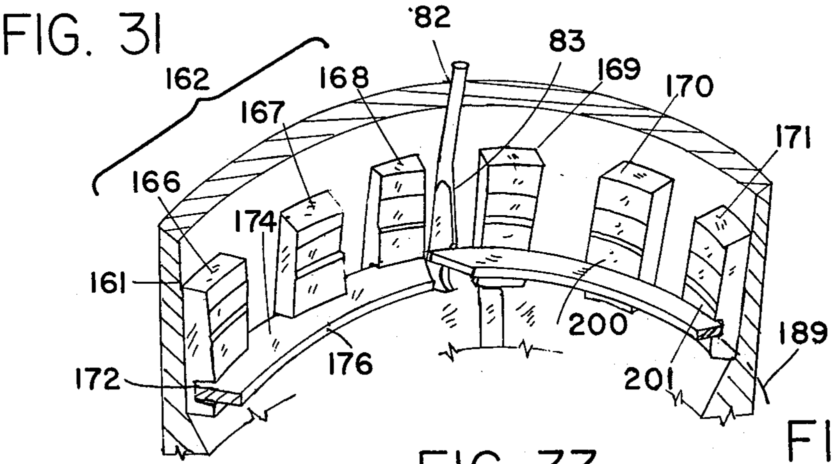
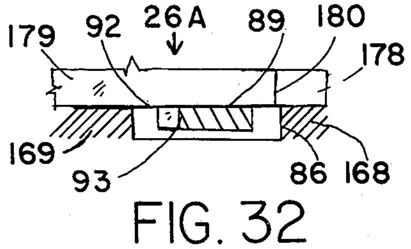
FIG. 32
FIG. 33
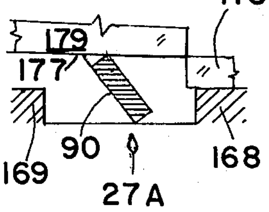
FIG. 34
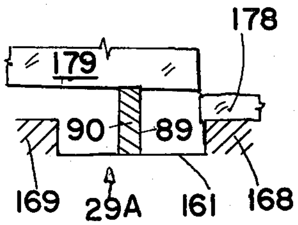
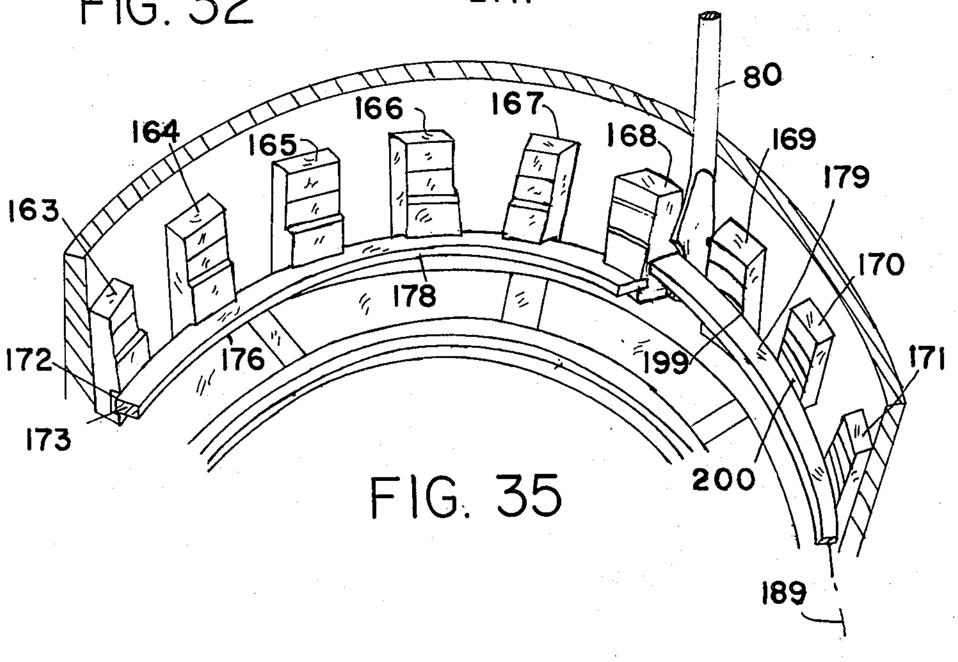
FIG. 35

APPARATUS FOR MANIPULATING SNAP RINGS

BACKGROUND OF THE INVENTION

The field of the invention is hand tools for removing and installing a variety of snap rings.

DESCRIPTION OF THE PRIOR ART

Snap rings or clips are formed of hard metal and rigidly resist displacement perpendicular to the flat plane of the cylindrical groove in which they are located in order to perform their function of reliably providing rigid projections from such grooves and thereby locate and/or position adjacent parts and structures relative to such rings and grooves. Adjustment, repair, maintenance, and substitution of such parts and structures adjacent to and positioned by such rings require removal of such snap rings or clips to permit removal of such parts. The removal of such rings is usually attempted by hand tools that usually not only so damage such rings or clips as to render them not useable for re-use, but also such removal by common hand tools is time-consuming, difficult, and not reliable.

The tools of this invention easily, reliably, and rapidly remove and replace such snap rings and clips without damage thereto and permit the reuse of such snap rings or clips.

SUMMARY OF THE INVENTION

While snap rings, and clips, when in place firmly resist displacement along the plane of such ring or clips and so are dimensionally stable in the flat surface of such rings, or clips, they are susceptible to torsion or twisting because they are thin and flat from edge to edge and they have no great strength in torsion along an axis extending the length thereof parallel to the flat surface thereof. On change of shape of a portion of the ring or clip from a flat surface to a twisted surface, at an angle to the plane of the initial flat surface of the ring or clip, the rings or clip are sufficiently flexible in a direction perpendicular to the thus formed plane of the initial flat surface of the ring or clip to be removed from grooves in holding means for such rings or clips.

The group of tools developed to utilize this characteristic of snap rings or clips by this invention provide for applying torsion forces to snap rings and clips to effect a small but definite resilient twisting of a wide or flat surface of such rings or clips, following which shape change such rings and clips are readily displaced in directions parallel to the initial wideflat surface of such rings or clips. Such distortion and displacements by the tools removes the portion or component of the snap ring or clip from the position thereof which holds the snap ring or clip in place and provides for ready removal of such ring or clip from its locked or fixed position. Following such removal of the snap ring, or clip, it may be reliably and conveniently put back in operative position by these tools as the tools also provide for facilitating the return of such rings and clips to their operative position.

BRIEF DESCRIPTION OF THE DRAWINGS

FIG. 1 shows the initial engagement of the tool 40 with the clip 114.

FIG. 6 shows the tool being turned about its axis and causing twisting of the flat surface of the clip 114.

FIG. 7 shows the portion of the clip that had initially engaged the groove in the master link pin laterally and vertically (or axially) displaced from that groove.

FIG. 8 shows the clip engaged and displaced and raised over the pin therefor.

FIG. 9 is a perspective view showing the chain clip distortion in an exaggerated manner to illustrate the deformation thereof effected by the tool 40 in steps shown in FIGS. 1 and 6–8.

FIGS. 10–12 are pictorial generally perspective views which show the sequence of stages in operation of the eye ring tool 60 operating on an eye ring 133. FIG. 10 is an initial stage of engagement of the tool and eye ring. FIG. 11 shows a subsequent position of the tool 60 while engaging and twisting the eye ring 133.

FIG. 12 shows the eye ring released from its engagement with the groove in which initially held.

FIGS. 13–16 are top views of the apparatus shown in FIGS. 10–12 diagrammatically showing stages in and direction of movement of the tool 60 and ear 136 of ring 133 during movement of the ear and tool during operation of the tool on the ear.

FIG. 13 is a diagrammatic view taken along the direction of arrow 13A in FIGS. 17 and 21.

FIGS. 14, 15, and 16, respectively, are enlarged views as seen along the direction of arrow 13A of FIGS. 17 and 21 in zone 13B of FIGS. 13 and 11 and show successive stages in movement of the ear of the eye ring of FIGS. 10–12 during stages of movement of the tool 60 at each of the stages also shown in FIGS. 18 and 22, 19 and 23, and 24, respectively.

Figure 17:
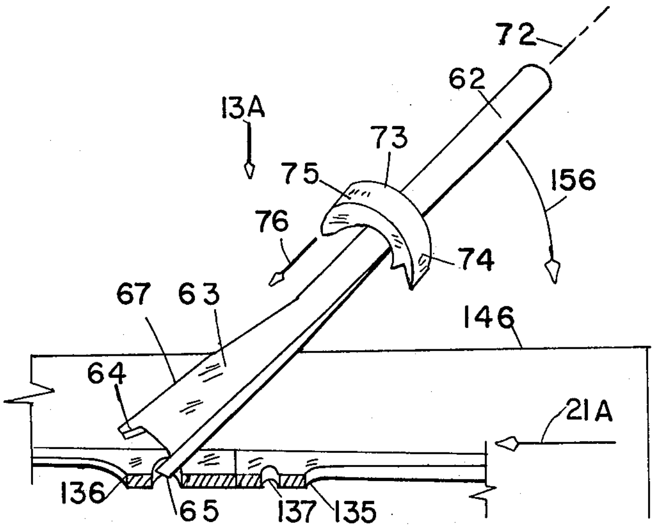
Figure 19:
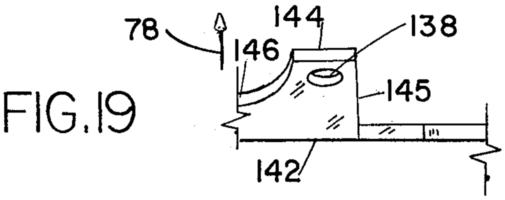
Figure 18:
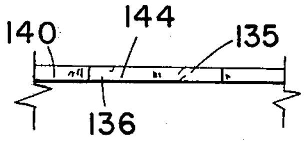

Each of FIGS. 17–19 is a radial view of the apparatus shown in FIG. 10 diagramatically showing stages in and direction of movement of the tool 60 during movement of the ear 136 and tool 60 during operation of the tool on the ear.

Figures 21, 22, 23, 24, 25:
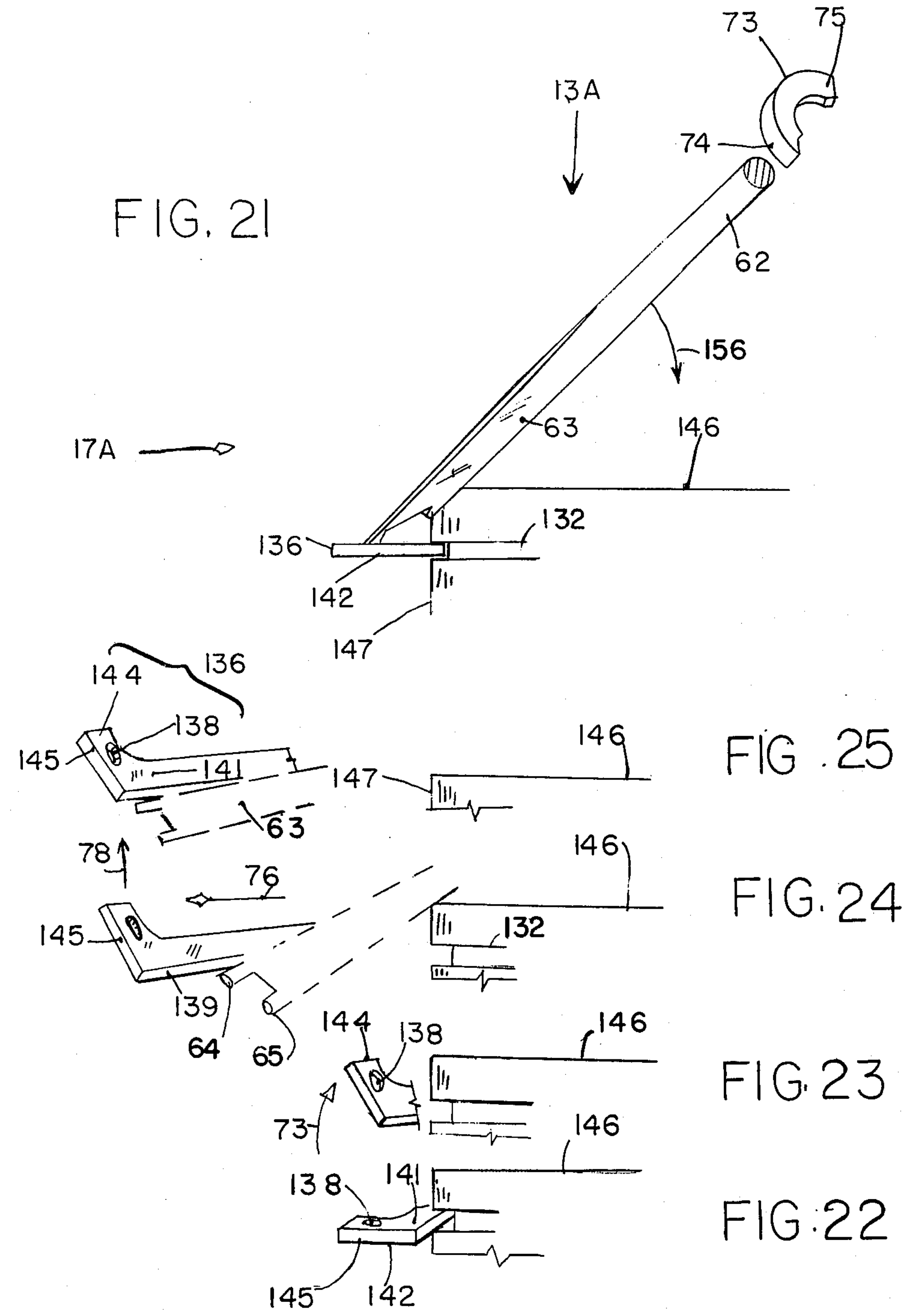

FIG. 17 is a diagrammatic view taken along the direction of arrow 17A in FIGS. 13 and 21.

FIGS. 18, and 19 are enlarged views as along the direction of arrow 17A of FIGS. 13 and 21 and in zone 13B of FIGS. 13 and 11 and show successive stages in movement of the ear of the eye ring during stages of its movement by the tool 60 at each of the stages shown in FIGS. 14, and 15.

Figure 20:
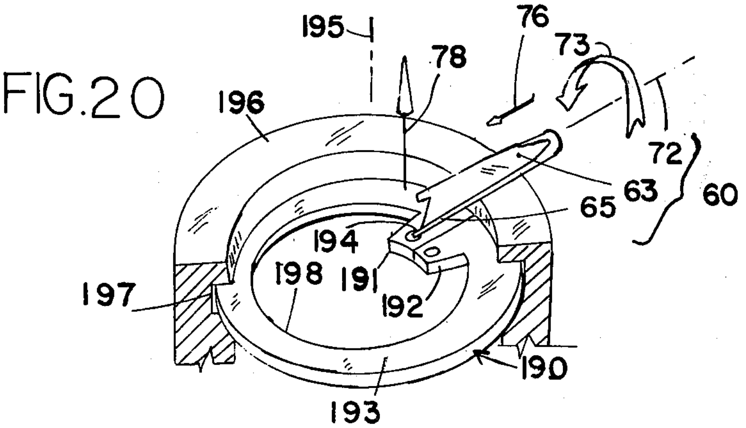

FIG. 20 is a diagrammatic perspective view of a tool as 60 enlarged with an eye ring with internally directed ear.

Each of FIGS. 21–25 is a diagrammatic tangential view of the tool 60 and the apparatus shown in FIG. 10 illustrating stages in and direction of movement of the tool 60 during operation of the tool on the ear 136.

FIG. 21 is a diagrammatic view taken along the direction of arrow 21A in FIGS. 13 and 17.

FIGS. 22, 23, 24 and 25 are enlarged views along the direction of arrow 21A in FIGS. 13 and 17 in zone 13B of FIGS. 13 and 11 and show successive stages in movement of ear 136 by the tool 60 at each of the stages shown in FIGS. 18, 19, and 20.

FIG. 25 is a view of a succeeding stage in movement of the ear 136 by tool 60.

Figure 28:
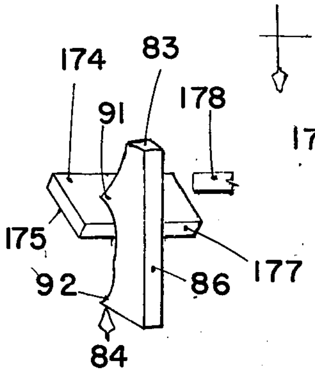
Figure 29:
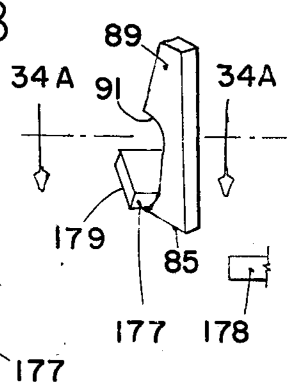
Figure 30:
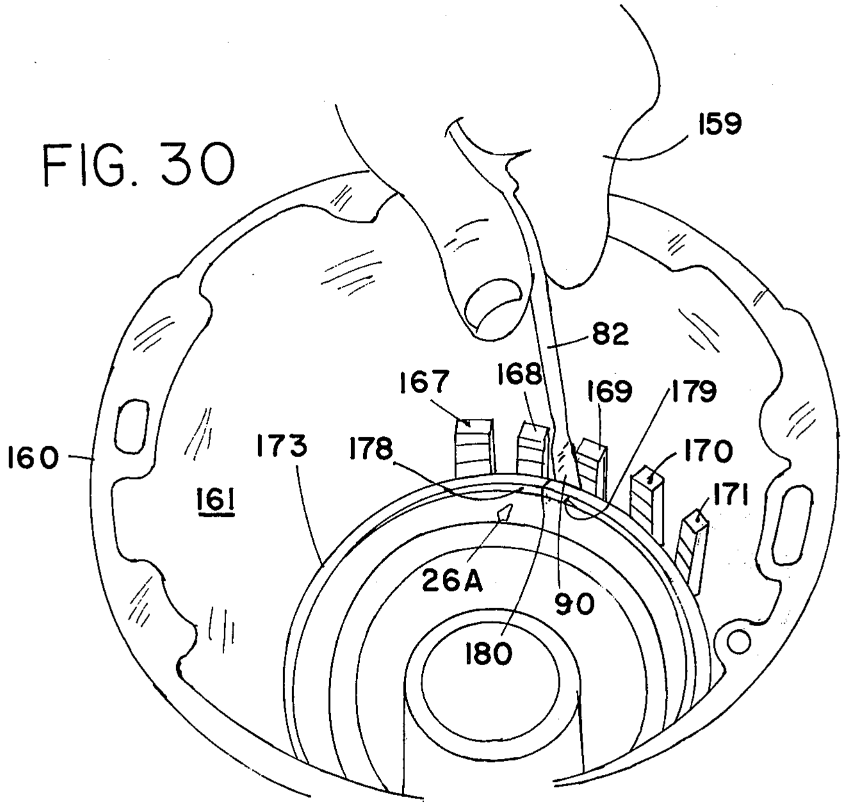

FIGS. 26–29 diagrammatically show successive stages in operation of the transmission tool 80 on a transmission snap ring in the zone shown as 26A in FIG. 30.

Figure 26:
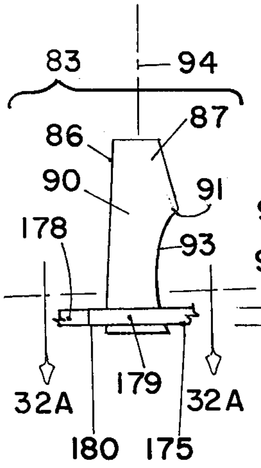

FIG. 26 illustrates a first stage of insertion or location of a tool 60 behind the ring 173 as seen in a direction of arrow 26A of FIG. 32.

Figure 27:
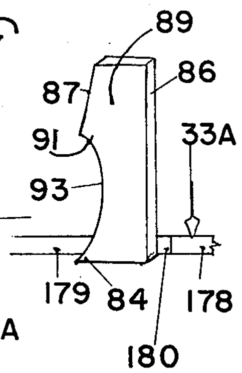

FIG. 27 is a rear view of the structure shown in FIG. 26 and is taken along the direction of the arrow 27A of FIG. 33.

FIG. 28 shows a stage following that shown in FIG. 27 and is shown as in FIG. 27.

FIG. 29 shows the tool 80 during lifting action as seen along the direction of the arrow 29A of FIG. 34.

FIG. 30 is a pictorial and perspective view of the stage of manipulation of the tool 80 in a transmission casing as in FIGS. 26 and 32.

FIG. 31 is an enlarged perspective view of zone 26A in FIG. 30 during the stage of operation of the tool 80 on ring 173 as in FIGS. 27 and 33.

FIGS. 32, 33, and 34 are diagrammatic transverse horizontal sectional views along the section 32A—32A of FIG. 26 and section 33A—33A of FIG. 27 and section 34A—34A of FIG. 29, respectively.

FIG. 35 is a pictorial view of the position of tool 60 and ring 173 operated upon thereby in a stage subsequent to that shown in FIG. 31.

Figure 36:
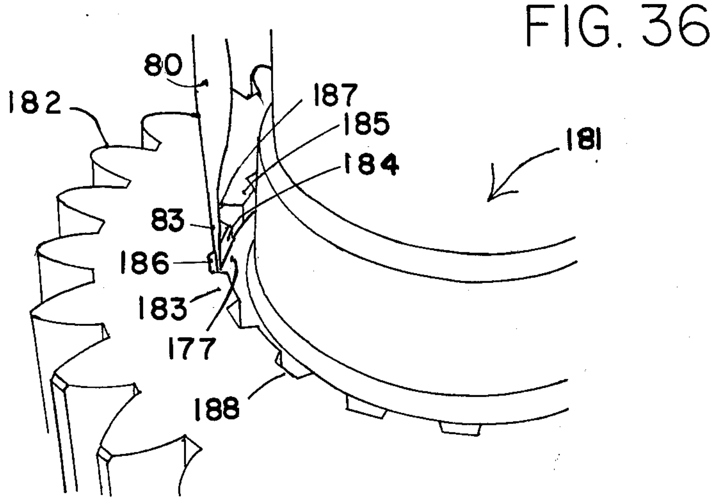

FIG. 36 shows the operation of a tool as 80 in an initial stage of its operation on a gear with a snap ring.

Figure 37:
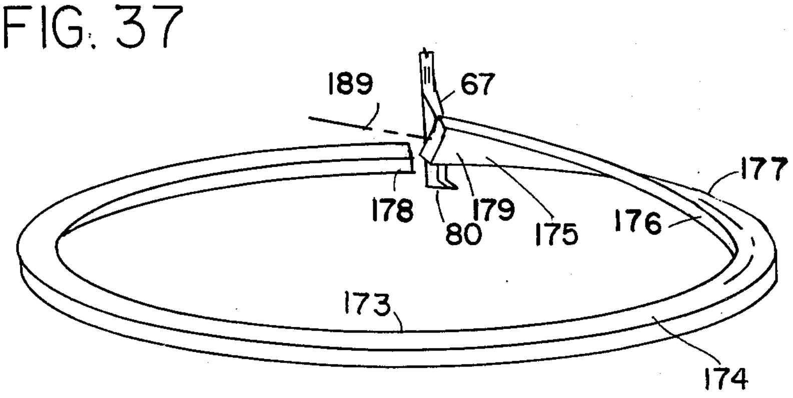

FIG. 37 is a diagrammatic perspective view of a snap ring in a transmission as in FIG. 31 and in a gear ring as in FIG. 36 showing a stage in the deformation thereof and movement thereof by the tool 80.

Figure 38:
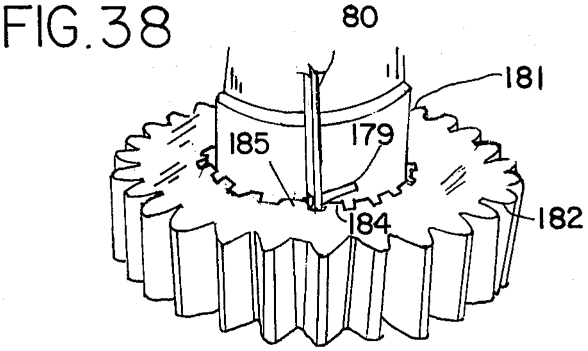

FIG. 38 shows the tool 80 and the gear ring in a stage of operation subsequent to that shown in FIG. 37.

DESCRIPTION OF THE PREFERRED EMBODIMENT

The tool 40 is particularly adapted to the manipulation of chain link clips. It comprises, an operative combination, a rigid handle 41, a straight shaft 42, and a blade assembly 43 all form of rigid steel and joined firmly to each other. The blade assembly 43 has a terminal tooth 44 which is adjacent to a blade end 45. The blade end is continuous with a rear blade shoulder 46. The rear blade shoulder 46 is spaced away from a front blade shoulder 47 and the front blade shoulder 47 is continuous with a recess 48, the terminal or peripheral end of which recess forms the recess edge of the tooth 44.

Figure 5:
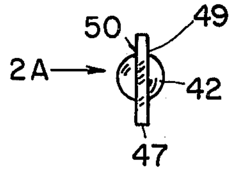
FIG. 5 is an end view of tool 40 as seen along the direction of arrow 5A of FIG. 2.

While the shaft 42 and handle 41 are circular in cross section as shown in FIG. 5, the blade assembly has a left blade face 49 and a right blade face 50 which are flat and parallel to each other. The recess 48 is generally semicircular in shape. The handle end 51 of that recess is substantially at 90 deg. to the front blade shoulder 46 and the peripheral edges of the recess, 52 are sharp edged forming a sharp angle with the blade faces 49 and 50. The central portion 53 of the recess is at a sufficient depth from the front shoulder 47 to engage as below described a chain clip.

The chain link tool 40 is directed to operate on a roller chain assembly to remove therefrom and add thereto a clip as 114 from the master plate as 111 of the master link.

Figures 1, 2, 3, 4:
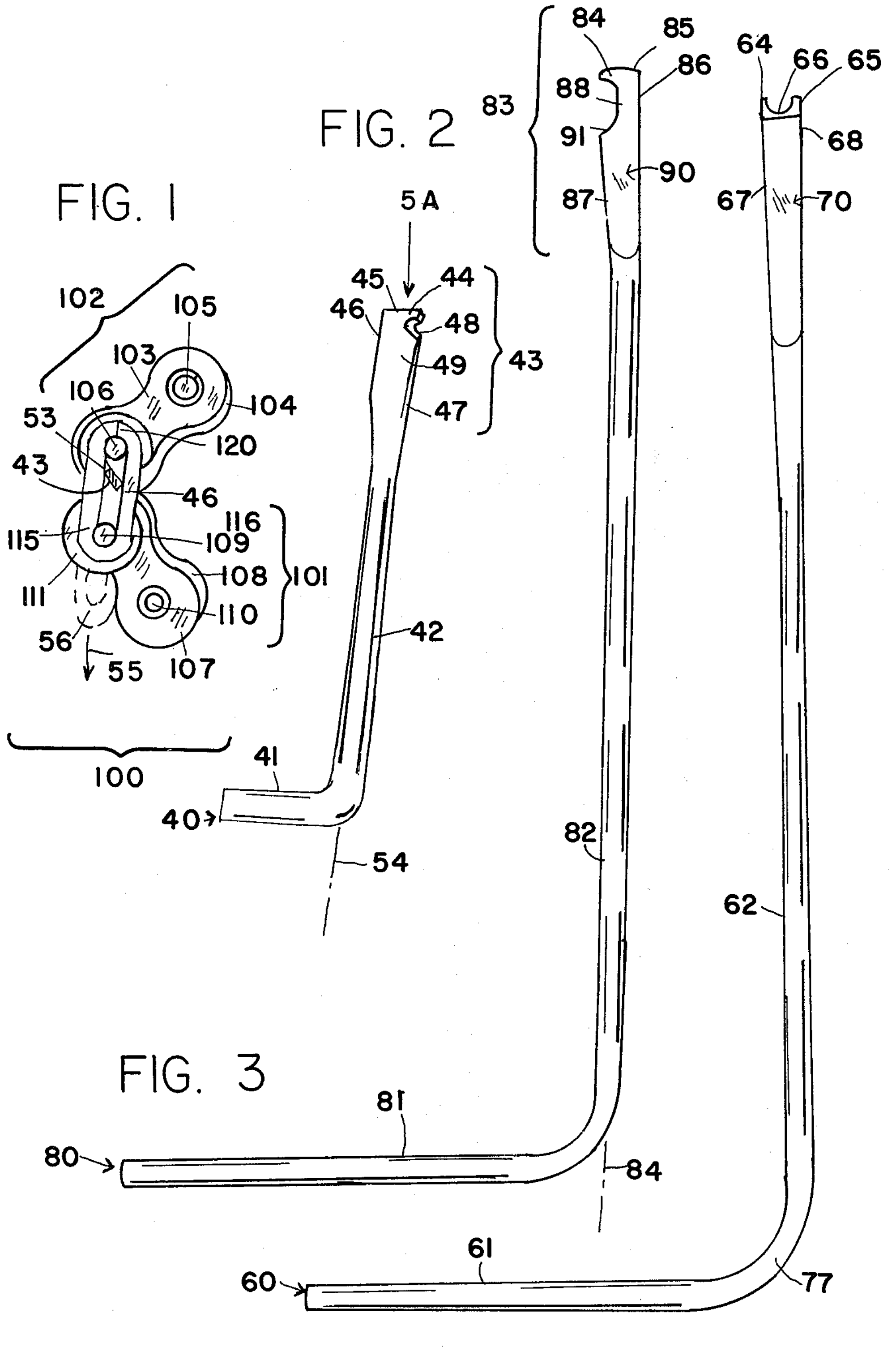
FIG. 1 is a top view of a chain link assembly to which the tool 40 of this system is applied; this figure is shown partly in a sectional view corresponding to section 1A—1A of FIG. 6.
FIG. 2 is a chain link or clip tool 40 drawn to scale as seen from a side thereof as seen along direction of arrow 2A of FIGS. 5 and 8.
FIG. 3 is a transmission and gear tool 80 according to this invention; it is drawn to scale and shown in side view.
FIG. 4 is a side view of an eye ring tool 60. This figure is drawn to scale and is shown in a side view thereof.

Generally the chain link on which the tool 40 operates comprises a lower (as shown in FIG. 1) link assembly 101 and a upper link 102 (as shown in FIG. 1) in a series of links joined by the master link plates 111 and 112. The top link 102 comprises a top plate 103, a bottom plate 104, a top roller pin 105, and a bottom roller pin 106 (top and bottom as shown in FIG. 1). The lower (as shown in FIG. 1) link comprises a top plate 107, a bottom plate 108, a top pin 109, and a bottom pin 110 connected in conventional manner. The pins 109 and 106 are joined by a top master plate 111 and a bottom master plate 112. The plates 111, 112, and clip 114 form the master link 113. The clip 114 is formed of hard spring steel with a straight edged left (as shown in FIG. 1) clip plate 115 and a straight edged right (as shown in FIG. 1) clip plate 116, and a circular closed clip end 117 and an openable clip end formed of a left (as shown in FIG. 1) 90 deg. circular end 118 and a right (as shown in FIG. 1) 90 deg. circular end 119 with the ends 118 and 119 meeting at a straight junction 120.

The clip left side plate has an inner edge 121 and the right link side plate has a inner edge 122 which, in their operative position (as shown in FIG. 1), are parallel to each other and engage a groove 126 in the pin 109 and a similar groove 127 in the pin 106. The left end plate 118 has a terminal free edge 123 which is adjacent to the free edge 124 at the end of the right and plate 119. The left side plate inner edge 121 has a portion 125 which engages the groove 127 in the pin 106. The edge 122 has a similar engaging portion which engages the groove 127 adjacent to the portion 125 when the clip is in its operative position as shown in FIG. 1.

Figure 6:
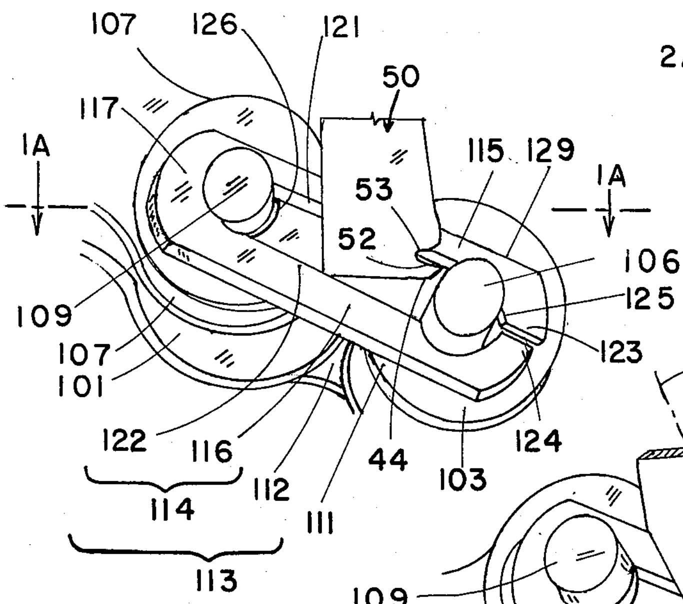
FIGS. 6, 7, and 8 are, with FIG. 1, a sequence of pictorial, generally perspective, views which show the clip tool in different sequential stages of operation on the clip 114 of the master link of a roller chain belt.
Figure 7:
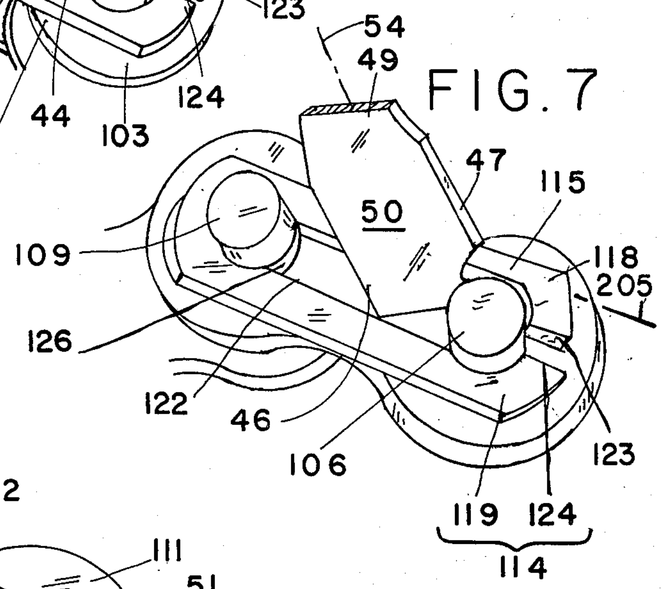

In operation of the clip tool 40, the shoulder 46 is located adjacent the clip inner edge of one of the plates such as the right side plate 116. While the tooth 44 is located with the peripheral sharp edge portion thereof between the plate 111 and the bottom edge of the clip left plate 115 as shown in FIGS. 1 and 6, rotation of the shaft 42 for a quarter turn (90 degrees) about its longitudinal axis 43 with shoulder 46 bearing against the right side plate inner edge 122 as shown in FIGS. 6 and 7 with the operator's 159 hand on the handle 41 forces the plate 115 near the portion thereof near the pin 106 to move away from the plate 116 and also causes the inner edge 121 of the left side plate 115 to twist about the outer edge 129 of the plate 115 and cause the left side plate free edge 123 to part from and rise above the right side plate free edge 124. In so doing the engaging portion 125 of the clip 114 that had theretofore engaged with the groove 127 is raised upward from the plate 111. The twisting of the plate 115, as shown pictorially in FIGS. 7 and 8 and shown diagrammatically in FIG. 9, provides that the plate 115 may be readily rotated about the closed end portion 117 to move the edges 123 and 124 away from each other in a plane parallel to the top flat surface of plate 111 as well as vertically in a direction perpendicular to the top flat surface of plate 111. Such movement provides for a resilient distortion of the plate 115 and displacement of the portions 123 and 124 from each other so that the edge 123 is lifted readily and controllably and reliably and resiliently above the top of the pin 106 and the thus vertically displaced edge 123 is set or rested on the top of shaft or pin 106. The tool 40 is then removed from engagement with clip 114. The clip ends 118 and 119 are then readily moved by the operator's thumb or finger or by tool 40 in the direction of the arrow 55 to the dashed line position 56 of clip 114 in FIG. 1 to disengage the openable left end 118 and openable right end 119 from engagement with the pin 106.

Figure 8:
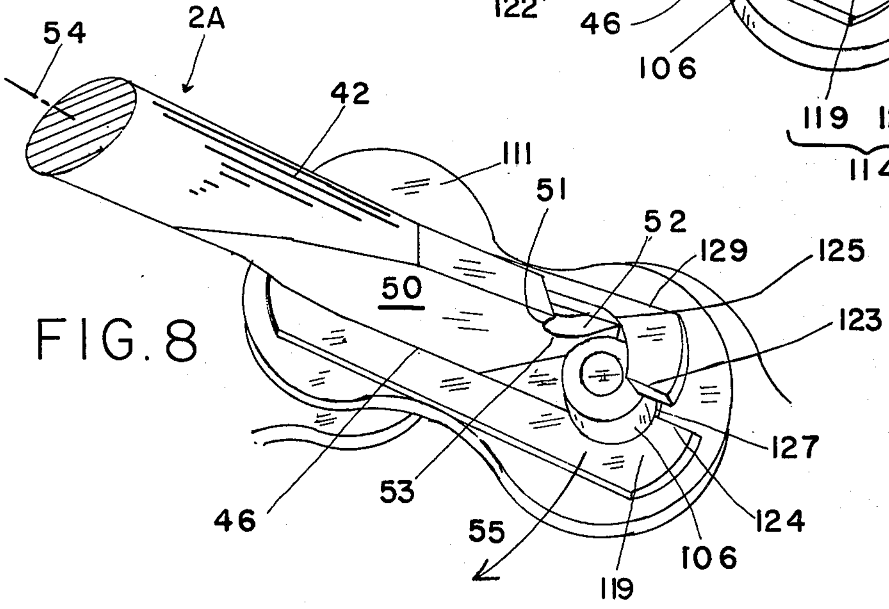

On movement of the clip 114 to the position shown in dotted lines as 56 in FIG. 1 the above described operation of tool 40 is repeated and the free edges 123 and 124 similarly moved apart and readily moved over and on and from the pin 109 for removal of the link 114 from the pins 106 and 109 theretofore engaged thereby. This is an extremely rapid convenient and reliable operation because the clip is only resiliently distorted only sufficiently to disengage the edges as 121, 122, 123 and 124 from the grooves in the pins 106 and 109. The distance between the curved circular closed end as 117 of the clip 114 to the closest portion of edges 123 and 124 is sufficient to allow the open clip to pass over pins 106 and 109. The blade assembly 50 where the rear blade shoulder 46 meets the blade faces 49 and 50 is sharp and hard so that during the rotation of the shaft 42 while the edge of the blade shoulder 46, where it joins the blade face 50, contacts the inner edge 122 of the right side plate of the clip 114 the clip is then forced to the right as shown in FIGS. 6, 7, and 8 so that the central ends (i.e. the ends closest to the end 117) of the edges 123 and 124 are moved to the right (as shown in FIGS. 6–8) during the operation of the chain link tool 40 on the clip 114 so as to permit the vertical movement of edge 123 relative to edge 124 and, with such release, the plate 115 is more readily rotated about the end portion 117. The knife edge relationship of the faces 49 and 50 to the peripheral edge 52 of the tooth 44 provides a very small acute angle against the bottom of the surface of plate 115 and the edge 52 of the tooth which does not inhibit the movement of the clip 114 to the right so that the edges 123 and 124 may be moved relative to each other as shown in FIGS. 6–9.

The eye ring tool 60 comprises a rigid handle 61, a straight rigid shaft 62, and a blade assembly 63 firmly joined together. The handle and the shaft are joined at a bent portion 77 and are circular in transverse cross section while the blade assembly 63 is formed with flat faces, 70 and 79. The blade assembly comprises a first terminal tooth 64 and, spaced away therefrom, a second tooth 65. A recess 66 is located between the teeth 64 and 65. A left, (as shown in FIG. 4) and a right blade shoulder are lateral or peripheral to each of the teeth. The inner recess edge 79 is spaced apart from the terminal portion of the teeth 64 and 65. A flat blade surface 70 extends between the edges or shoulder 67 and 68 on one side of the eye ring tool 61 and such surface is generally parallel to an opposite surface 79 parallel thereto.

The eye ring tool 60 operates on an assembly 71 of eye ring as 133 and a machine element attached thereto such as a piston 131. Details of the manipulation of the eye ring by the tool 60 are below set out. Generally the tool 61 is operated to rotate 90 degrees about a longitudinal axis 72 parallel to and extending through the shaft 62. Such rotation provides for a direction 73 of rotation of a tooth which engages an eye of the eye ring and moves such eye ring portion from a lower lateral position as 74 to a central raised position 75 as indicated diagrammatically in FIGS. 13–19 and 21–25. Following such rotation and twisting of the eye ring portion axial movement of the tool 60 is provided which results in complete release of the eye ring from the position in which it had each initially been held and such release is accomplished only by a resilient displacement of the portions of the eye ring relative to each other and such motion is deliberately and readily controlled by the operator.

More particularly a machine element such as a piston 131 is provided with a annular groove as 132 within which a conventional eye ring 133 is located. The eye ring comprises an annular portion 134 with laterally projecting ears 135 and 136 with eyes 137 and 138 in each of the ears 135 and 136. The inner edge 139 of the circular portion or annular portion 134 engages the groove 132 and the outer edge 140 is peripheral or radial thereto. The annular portion has an upper flat surface 141 and a lower flat surface 142. A circular axis 143 extends through the annular portion of the ring. The ring is made of thin, i.e., about 1/16 inch to about 1/32 inch, and flat steel having a width measured radially of between an ⅛ and ¼ of an inch depending on the size of the ring; generally the width is much greater then the thickness so that the ring is twistable about the annular axis although not readily displaced in the plane of the upper or lower surfaces 141 and 142. Each ear as 136 has an outer edge 144 and a diametrically extending edge 145. The groove 132 is spaced about ⅛ inch, in the apparatus shown in FIG. 10, from the top 146 of the piston. The cylindrical or vertical surface of the piston 147 is at right angles to the flat top surface 146 and a bevel edge 148 is usually provided between the top surface 146 and the vertical surface or edge 147.

In operation of the apparatus 60 the handle 61 is located with one tooth as 65 engaged within the eye as 138 of the ear 136, while the left (as shown in FIG. 4) shoulder 67 of the tool 40 engages the top edge or the edge of the top 146 of the piston. The tool 60 is then rotated 90 degrees or one quarter turn about the axis 72. The axis 72 is held at an oblique angle to the top surface 146 as well as to the radius extending to the piston surface 147 from the longitudinal axis 149 of the piston. As shown in FIG. 13 the axis 72 extends at 45 degrees to the direction of the radius from the axis 149 as seen in the horizontal plane and, as shown in FIGS. 17 and 21, the axis 72 also extends at an angle of about 45 deg. to the line of the vertical axis 149 of the cylindrical piston 131. Accordingly, a 90-degree rotation of the tool 60 with its tooth 64 engaged with the eye 138 of the ear 136 provides a rotation of the ear from the horizontal position as shown in FIGS. 14 and 18 and 22 to the twisted and sloped position shown in FIGS. 15 and 19 and 23. Following such twisting the location of the ear 136 of eye ring 133 is then radially, resiliently, displaced from the position as shown in FIGS. 15 and 23 to the position shown in FIGS. 16 and 24 (and also shown at the top of FIG. 13 in dashed lines). Such radial displacement of the ear occurs on axial movement of the tool 60 along the direction of the arrow 76. Once in such radially displaced position, as shown in FIG. 13 in dashed lines and also in FIG. 11 in perspective, the ear 136 is then readily moved upwardly as shown in FIG. 19 in direction shown by arrow 78. After rotating the tooth 65 located in the eye 138 to displace the ring radially of the groove 132 therefor, as above described and shown in FIGS. 15, 19, and 25, the other tooth 64 is located as shown in full lines in FIG. 13 behind the ring between the inner edge 176 of the ring and the groove in which such rings was theretofore located. Then the tooth 65 is released from the eye 138 and tooth is rotated behind the ring and against the side wall 147 or edge of such side wall and top of piston as shown in dashed lines in FIGS. 13, 16, and 24, and the tool 60 rotated in direction of arrow 156 to pry the ring upward and outward from the position of FIG. 24 and in dashed lines in FIG. 13 to position of FIGS. 12 and 25.

The eye ring is thus readily moved from its initial position attached to piston 131 in FIG. 10 to the intermediate position of FIGS. 15, 19, and 23 to the released position shown in FIG. 12. Generally, the ear of the eye ring is positively moved for a readily controllable distance by initial torsion applied to the ring about its annular axis following which a radial and then upward displacement of the ear is readily effected. Without such torsion, the radial and upward displacement is not a smooth gradual controllable movement but with such tool there is a ready and accurate control thereof.

The transmission tool 80 comprises a rigid straight handle 81 attached substantially at right angles to a rigid straight shaft 82 and a blade assembly plate 83. The blade assembly plate is a rigid flat plate which is firmly attached to the end of the shaft distant from the handle and comprises a tooth 84, next to a blade end 85, which blade end extends from a straight rear blade shoulder or edge 86 to a front blade shoulder or edge 87. The generally straight front blade shoulder or edge has a recess 88. The blade assembly plate also comprises a flat right blade face 89 and a flat left blade face 90. The recess 88 has a outwardly concave handle end 91 and a outwardly concave peripheral portion 92. The central recess face portion 93 is longer than the width of the blade end 85. An axis of rotation 84 extends along the center of the shaft 82.

This tool 80 is directed to the manipulation of a snap ring as 173 in a transmission casing as 160.

In a conventional transmission casing as 160 which casing has a generally axially symmetrical shell wall 161, a plurality of like positions 163–171 are located around and fixed to the interior of the shell wall 161 and form a positioners assembly 162. Each of the positioners has a slot as 172 which serves to position the snap ring 173. The ring 173 is formed of a hard spring metal, as is conventional in such snap rings, and has a upper flat surface 174 and a flat bottom surface 175 with a central or inner edge 176 that is circular and concentric therewith and radial or outer edge 177. Such rings are conventionally split and, as illustrated in FIGS. 30, 31, and 35 have a left free edge 178 and a right free edge 179 which, in the normal operating position of such rings, are adjacent to each other at a junction 180.

The tool 80 is manipulated by an operator 159 to initially locate the blade assembly 83, as shown in FIG. 32, between the radial or outer edge 177 of the ring and the shell wall 161. A subsequent ¼ turn (or 90 degree rotation) of the tool 80 about the axis 94 is then provided with the tooth 84 located below the bottom flat surface 175 of the ring 173 as shown in FIGS. 26 and 27. Concurrently, pressure downward by the operator is provided so that the handle end 91 of the recess 88 presses downwardly on the upper surface 174 of the portion 179 ring adjacent to the junction 180 of two free ends as 178 and 179 while the rear blade shoulder 86 presses against the wall 161 and the central portion 83 of the recess presses on the outer or radial edge 177 of portion 179 of the ring. This positioning and action causes a twisting as well as a central movement of that portion of the ring as shown in FIGS. 28, 33 and 34. Because of the torsion, as shown in FIG. 28, the ring is readily moved centrally a predetermined distance to allow its escape from slots as 172 in the positioner block as 169. Following such central movement of the portion of the thus twisted ring the peripheral end 92 of the recess at the top of the tooth 83 is able to be moved by the operator to contact and to raise the free edge 179 of the ring 173 as shown in FIG. 35 and thereby move such portion of the ring upward from the level at which it was initially held in the groove or slot within the positioner block 169 and locate the first portion of the ring 173 so initially contacted, manipulated and displaced on the shoulder, as 199, on positioner block 169 adjacent the slot in groove 172 in which such portion of the ring was initially located. Following such contact, manipulation and displacement of such first portion of the ring between positioners 169 and 170 successive portions of the ring initially located in the slot as 172 in positioner block as 170 are similarly contacted, manipulated and displaced and located on an adjacent shoulder as 200 on an adjacent positioner blocks as 170, and then on shoulder 201 of block 171 until the entire ring is removed from the slots or grooves in which initially held and such removal is accomplished conveniently and reliably and rapidly and without buckling of the ring.

The leverage applied by the operator on the handle 81 provides a substantial amount of force through the shaft 82 and plate 83 to the ring and, also, the handle provides for downward pressure by the operator to cause torsion of the ring 173 and so facilitate the manipulation of the ring for a small readily controllable definite amount, within the elastic range, of displacement of that ring so that the ring is removed without damage thereto and may be subsequently reused. For re-use the ring 173 is placed generally in the position as shown in FIG. 35 and then the blade end portion 85 of the tool is used to press the ring downward generally and into place, following which tool 80 is then positioned as shown in FIGS. 34 and 28 to apply torsion to the ring and, using the ring position action shown in FIGS. 34 and 33, the ring 173 is gently moved down so that it snaps into place in a reliable and controlled manner.

The apparatus 60 also serves to manipulate eye rings as 190 in FIG. 20 of which the ears, 191 and 192, extend centrally of the annular portion as 192. For operation on this type of eye ring the tooth as 65 of the tool 60 is manipulated to engages the eye as 194 in ear 191 while the axis 72 of the tool 60 is held obliquely to the central longitudinal axis 195 of the annular portion 193 of ring 190. Such axis is also the central longitudinal axis of the cylindrical apparatus element 196 to which the ring is attached. This oblique angular relationship of axis of tool 60 and axis of the apparatus element holding the snap ring 190 is the same as above discussed in relation to tool 60 and element 131 and illustrated in FIGS. 13, 17, and 21. Tool 60 is then rotated ¼ turn around its axis 72 (in the direction of the arrow 73 as shown in FIGS. 13, 17 and 21, and then moved axially, or longitudinally of shaft 62 and in direction of arrow 76 as in FIG. 13 and then upwardly as shown by arrow 78 in FIGS. 19 and 20 and in FIG. 24. In so doing the ear 141 is rotated and moved as is the case with ear 136 and as shown in FIGS. 14–16, 18, 19, and 22–25. When so twisted the ring 190 is readily distorted resiliently in a direction extending along the radius of a circle that corresponds to or matches the circular inner edge 198 of the annular portion 193 of the snap ring 190 and the grooves as 197 in which such ring 190 is located on the apparatus element as 196. Following such distortion of the snap ring 190, it is moved out of the groove as 197 in which it had been theretofore located and then controllably and conveniently moved upward and released from apparatus element 196 as above discussed for movement of the ring 133 by tool 60. Similarly, to replace the ring 190 in groove 197 engagement of the tooth 65 of the tool 60 with the eyes 194 in to the ear 191 provides for a ready engagement with and control of position of the eye and of the ear so that the ring 190 may be readily, in its controllably contracted and twisted condition, located adjacent to the groove as 197 in which to be located and then may be controllably and precisely released to be thus readily and conveniently located or installed in such groove as above discussed in regard to the operation of tool 60 in element 131.

FIG. 37 is a diagrammatic and perspective view of the ring 173 such as is in the transmission 160 of FIGS. 26–35 and in the gear ring of FIGS. 36 and 38. FIG. 37 illustrates diagrmmatically the deformation of a snap ring as 173 which is effected by the above-described action of the tools 80 and 60. As diagrammatically shown in FIG. 37, the outer edge 177 of the annular ring 173 is moved inwardly or centrally while the inner ede 176 is also moved centrally and also vertically with respect to the outer edge. This movement of the outer edge permits release of the ring from the groove, as 172 in which held and is facilitated by the twisting of the snap ring material along the circular or annular axis 189 of the ring 173 as the ring may then be readily resiliently bent in a direction perpendicular to the flat face thereof without buckling. The same absence of buckling is provided in the above described slight yet controlled resilient deformation of the clip 114 and eye ring 133. Without buckling there is no permanent deformation of the ring or clip and such ring or clip may be reused. Without the gradual, resilient and limited deformation provided by tools 40, 60 and 80, the risk of producing such buckling is substantial even with highly experienced mechanics. The buckling of the rings and clips causes a permanent deformation or creasing of said rings or clips which not only makes the removal of such rings difficult but also makes impractical any attempt at reuse of such rings or clips in the structure from which it had been removed.

FIGS. 36, 37 and 38 illustrate the application of a modification of the transmission tool 80 to manipulating a snap ring as 173 usually held in a gear ring as used in diesel engines. The tool 80 provides for removal and installation of such type of snap ring in a reliable convenient efficient manner and permits reuse of the snap ring. As shown in FIG. 36, plate 83 of the tool 80 is inserted between the outer edge 177 of the generally flat annular snap ring 173 and the inner surface of the groove for such snap ring in the gear ring. Plate 83 of tool 80 is first located in a space as 186 between interior teeth or lugs 183 and 184 adjacent to the junction as 180 between free edges, as 178 and 179 of the ring 173. Plate 83 is located in a position as shown in FIGS. 26 and 32 between the outer edge of the snap ring and the inner wall 188 of the gear ring. The plate 83 is inserted so that its hook as 84 is located below the lower surface of the ring; the shaft 82 of tool 80 is then rotated up to one-quarter of a turn (90 degrees) with the recess 83 open inward or centrally. Such rotation causes the engagement of the edge of the recess with the outer surface of the ring. Together with a vertical movement of the tool 80 such engagement provides for a twisting of the annular axis 189 of the ring as well as a central movement of the outer edge of the ring, which provides for a twisting of the ring and a central displacement thereof. After a first portion of the ring is twisted and radially contracted, and set or rested on the shoulder of the interior tooth or lug as 184 adjacent the groove in such lug in which that first ring portion was initially located, the tool may be inserted in another neighboring space as 187 between lugs or interior teeth 184 and 185 and be again operated as above described to cause further removal of further increments of length of the ring by similarly resiliently twisting, contracting and displacing successive neighboring or adjacent portions of the ring and moving such portion of the ring out of the groove therefor in the gear structure, and set or rested on the shoulder of the interior tooth or lug as 185 adjacent the groove or slot in such lug in which such successive portion of the ring had theretofore been located, as shown in FIG. 38. The distortion of the ring is illustrated in FIG. 37 where a first portion of the ring is contracted radially, i.e., the radius of the outer edge of the ring is reduced and the radius of the inner edge of the tool is also reduced by the actuation of the tool 80, but not as much as is the outer edge.

The tooth 84 of the tool 80 is thus applied to successive neighboring portions of the ring until the entire ring is, as shown in part in FIG. 38, removed from its position in the gear and such removal is accomplished, without buckling, only by a series of small, resilient deformations of the ring. The tool 80 provides that the limited space available between a shaft as 181 and gear as 182 is still adequate for the reliable removal of each of the successive increments of the ring for from the groove in which initially held.

The rigid and dimensionally stable characteristics of the blade plates 43, 63 and 83 of the tools, 40, 60 and 80, respectively provide that the location and movement of the teeth thereof, as 44, 64, 84, in engagement with the edges of the plates of the clip edges of the rings, and eyes of ears of rings as above described, provides that a limited and predetermined and readily controlled and adequate amount of rotary and radial displacement is effected by the rotation and movement of the shaft as 42, 62 and 82 of the tools 40, 60 and 80. Thereby, only a predetermined and controlled amount of displacement and torsion is effected and the twisting and displacement is thus only effected for a limited, yet predetermined, amount and so avoids any excess movement as might cause buckling of the relatively rigid, yet bendable, shaped plates of which such clips, ears and rings are formed.

In a preferred embodiment of the chain link tool 40, the overall length (blade end 45 to distance end of handle 41 measured along length of shaft 42) is 3½ inches and handle 41 is ¾ inch long; blade assembly 43 is 1/16 inch thick and recess 48 is 3/16 inch long and 1/16 inch deep and blade end 45 is 5/16 inch side. The handle 41 and shaft 42 are made of 3/16 inch diameter rod.

The automatic transmission tool 80 is 7½ inch long total, measured along shaft 82 and handle 81 is 3½ inch long, both formed of 3/16 inch diameter rod; blade 83 is 1/16 inch thick, 1¼ inch long, and 5/16 inch wide at its end 85. Tooth 84 is 1/32 inch high (measured vertically as in FIG. 3) and recess 83 is 3/16 inch high and 1/16 inch deep. For gears of diesel engines as in FIGS. 36 and 38 (10 and 13 speed) recess 82 is 0.175 inch long and 1/16 inch deep and circular in shape, rather than as shown to scale in FIG. 3 for the transmission tool, the blade end 85 is 3/16 inch wide.

The eye ring clip tool 60 is 8½ inches long total, measured along shaft 62, and is formed of 3/16 inch diameter steel rod. The handle 61 is 3½ inch long measured along its length to the center of shaft 62; blade 63 is 1¼ inch long and 1/16 inch thick; the shoulders 67 and 68 are 3/16 inch apart and one tooth (65) is 1/16 inch diameter and the other is 1/32 inch diameter (for different size eyes) and recess 66 is 7/64 inch deep.

The transmission tool 80 is made of welding rod (alloy RG 60, heat 48419). At its tooth 84 the Rockwell hardness is 25–30 on the C scale but the shaft is 11 on Rockwell C scale and the handle hardness is 8 on the Rockwell C scale. The tools 40 and 60 have similar hardness at similar tooth, shaft and handle locations.

The particular size of the clip as 114 varies according to the size of the chain 100. The dimensions of the clip tool 40 accordingly are chosen with respect to such clip size so that the distance from the rear shoulder 46 to the center of the recess 43 are such that there is an angle greater than 45 degrees and less than 80 degrees, preferably 55–60 degrees, between the plane of the surface of the blade face 50 and the plane of the inner edge 122 of the clip at the corner formed by the rear blade shoulder 46 and the rear edge of the face 50 during final (FIG. 8) stage of the operation of the tool 40 on the clip 114 in the relations shown in FIGS. 6, 7, and 8. In the above-described operation of tool 40 on clip 114 the peripheral portion 52 of recess 48, which forms the upper face or top of the razor-sharp tooth 44, engages the bottom of the clip plate 115 adjacent the shaft 106 before the plate 115 begins to be twisted about the longitudinal axis, as 205, or length of such rectangular straight-edged plate (the inner edge 121, and outer edges as 129 of each of the plates as 115 being parallel to each other when such plate, as 115, is flat). The size of the tool 80 is chosen so that as the razor sharp front edge of the tooth 44 first contacts the inner edge 121 of the plate 115 adjacent to pin 106 the angle of the blade surface 49 and such inner edge is about 45 degrees. The curved central portion 53 of the recess 48 cause twisting of the plate 115 on rotation of the shaft 42 as well as displacement of edges 121 and 122 as above described. The minimum distance across the surface 50 from the rear shoulder 46 to the recess 43 is chosen to provide that, as shown in FIGS. 1, 6, 7, and 8 for the preferred embodiment, the plate 115 is twisted about its length as well as displaced away from the inner edge 122 of the other, like plate 116 of the clip 114 on operation of the tool 40. The dimensions of tool 40 given is for a 30–60 type of roller chain; corresponding different size of such tool would be used for different sizes of clips, where the distances between inner edges of plates as 115 and 116 and the dimensions across the blade 43 would be different; FIGS. 1, 5, 6, 7, and 8 are drawn to scale to illustrate the above described relationships.

I claim:

1. A transmission tool comprising a rigid straight handle firmly attached substantially at right angles to a rigid straight shaft, and a blade assembly, said blade assembly being a rigid flat plate which is firmly attached to the end of the shaft distant from the handle and comprises a tooth next to a blade end, which blade end extends from a straight rear blade edge to a front blade edge, said front blade edge having a recess, said plate assembly plate also comprising a flat right side blade face and a flat left side blade face, said recess having an outwardly concave handle end and an outwardly concave peripheral portion adjacent said tooth and a central recess face position.

2. Apparatus as in claim 1 wherein said central recess face portion is longer than the width of the blade end.

3. Apparatus as in claim 1 wherein said plate has a Rockwell C hardness of 25 to 30.

* * * * *